United States Patent
Li

(10) Patent No.: US 11,334,415 B2
(45) Date of Patent: May 17, 2022

(54) DATA STORAGE DEVICE AND METHOD FOR SHARING MEMORY OF CONTROLLER THEREOF

(71) Applicant: Silicon Motion, Inc., Jhubei (TW)

(72) Inventor: An-Pang Li, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 16/503,504

(22) Filed: Jul. 4, 2019

(65) Prior Publication Data

US 2020/0065190 A1 Feb. 27, 2020

Related U.S. Application Data

(60) Provisional application No. 62/721,767, filed on Aug. 23, 2018.

(51) Int. Cl.
*G06F 11/07* (2006.01)
*G06F 9/32* (2018.01)
(Continued)

(52) U.S. Cl.
CPC ........ *G06F 11/0772* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS 5,787,493 A * 7/1998 Niijima .................. G06F 12/10
711/152
5,978,953 A * 11/1999 Olarig ................. G06F 11/1016
714/758
(Continued)

FOREIGN PATENT DOCUMENTS

TW     I222597 B    10/2004
TW     I309773 B    5/2009
(Continued)

OTHER PUBLICATIONS

Farbeh et al., Memory mapped SPM: Protecting Instruction Scratchpad Memory in Embedded Systems against Soft Errors, IEEE, Conference Paper, pp. 218-226 (Year: 2012).*

(Continued)

*Primary Examiner* — April Y Blair
*Assistant Examiner* — Dipakkumar B Gandhi

(57) ABSTRACT

A data storage device and a method for sharing memory of controller thereof are provided. The data storage device comprises a non-volatile memory and a controller, which is electrically coupled to the non-volatile memory and comprises an access interface, a redundant array of independent disks (RAID) error correcting code (ECC) engine and a central processing unit (CPU). The CPU has a first memory for storing temporary data, the RAID ECC engine has a second memory, and the controller maps the unused memory space of the second memory to the first memory to be virtualized as part of the first memory when the second memory is not fully used so that the CPU can also use the unused memory space of the second memory to store the temporary data.

8 Claims, 6 Drawing Sheets

(51) Int. Cl.
- *G06F 13/16* (2006.01)
- *G06F 11/20* (2006.01)
- *G06F 9/48* (2006.01)
- *G06F 9/54* (2006.01)
- *G06F 13/24* (2006.01)
- *G06F 3/06* (2006.01)
- *G06F 11/10* (2006.01)
- *G06F 11/22* (2006.01)

(52) U.S. Cl.
CPC ............ *G06F 3/0689* (2013.01); *G06F 9/327* (2013.01); *G06F 9/4812* (2013.01); *G06F 9/546* (2013.01); *G06F 11/1076* (2013.01); *G06F 11/2043* (2013.01); *G06F 13/1663* (2013.01); *G06F 13/1668* (2013.01); *G06F 13/24* (2013.01)

(56) References Cited

U.S. PATENT DOCUMENTS

| | | | | |
|---|---|---|---|---|
| 6,070,255 | A * | 5/2000 | Dell | G06F 11/1052 714/48 |
| 6,604,214 | B1 * | 8/2003 | Fukushima | G06F 11/1008 714/746 |
| 2005/0229089 | A1 * | 10/2005 | Oza | G06F 11/1044 714/801 |
| 2008/0195916 | A1 * | 8/2008 | Lee | G06F 11/1068 714/764 |
| 2008/0201625 | A1 * | 8/2008 | Mulligan | H04L 1/0043 714/758 |
| 2008/0270707 | A1 | 10/2008 | Kamei et al. | |
| 2009/0138673 | A1 * | 5/2009 | Wilson | G06F 12/06 711/211 |
| 2014/0075265 | A1 * | 3/2014 | Hung | G11C 29/42 714/763 |
| 2015/0033065 | A1 * | 1/2015 | Canepa | G06F 11/1008 714/6.11 |
| 2018/0067800 | A1 * | 3/2018 | Gusev | G06F 3/0685 |

FOREIGN PATENT DOCUMENTS

| | | |
|---|---|---|
| TW | 201111991 A1 | 4/2011 |
| TW | I463314 B | 12/2014 |

OTHER PUBLICATIONS

Solihin et al., Automatic code mapping on an intelligent memory architecture, IEEE, vol. 50, Issue: 11, pp. 1248-1266 (Year: 2001).*

Chen et al., Fault-containment in cache memories for TMR redundant processor systems, IEEE, vol. 48, Issue: 4, pp. 386-397 (Year: 1999).*

* cited by examiner

DATA STORAGE DEVICE AND METHOD FOR SHARING MEMORY OF CONTROLLER THEREOF

FIELD OF THE INVENTION

The present invention relates to a data storage device, and more particularly to a data storage device and a method for sharing memory of a controller thereof.

BACKGROUND OF THE INVENTION

Generally, a data storage device is composed by a controller and a non-volatile memory such as a flash memory. The controller mainly includes a central processing unit (CPU), which has its own memory. Such CPU memory is for storing data or programs. However, since the size of the CPU memory is usually fixed, the CPU will store data or programs to a dynamic random access memory (DRAM) outside the controller when size of the data or programs to be stored in the CPU memory is larger than the available space of the CPU memory. However, since the speed at which the CPU accesses the external DRAM is much slower than the speed at which CPU access the internal CPU memory, the performance of the overall system decreases.

SUMMARY OF THE INVENTION

In view of this, the purpose of the present invention provides a data storage device and a method for sharing memory of controller thereof. To achieve the above purposes, the embodiment of the present invention provides a data storage device, which comprises a non-volatile memory and a controller electrically coupled to the non-volatile memory. The controller comprises an access interface, a redundant array of independent disks (RAID) error correcting code (ECC) engine and a CPU. The access interface electrically couples to the host and the non-volatile memory. The RAID ECC engine is mainly used to perform an error correction procedure, and the CPU is used to interpret write/read commands issued by the host, and to control the access interface to access the non-volatile memory for the user data access. The CPU has a first memory for storing temporary data, the RAID ECC engine has a second memory and the controller maps the unused memory space of the second memory to the first memory to be virtualized as part of the first memory when the second memory is not fully used so that the CPU can use the unused memory space of the second memory to store the temporary data.

In addition, the embodiment of the present invention further provides a method for sharing memory of controller, which adapts to the data storage device and comprises following steps. Firstly, the CPU transmits at least one control signal to the RAID ECC engine. Then, according to the control signal, the RAID ECC engine maps the unused memory space of the second memory to the first memory of the CPU to be virtualized as part of the first memory so that the CPU can use the unused memory space of the second memory to store the temporary data.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

DETAILED DESCRIPTION OF PREFERRED EMBODIMENTS

Figure 1:
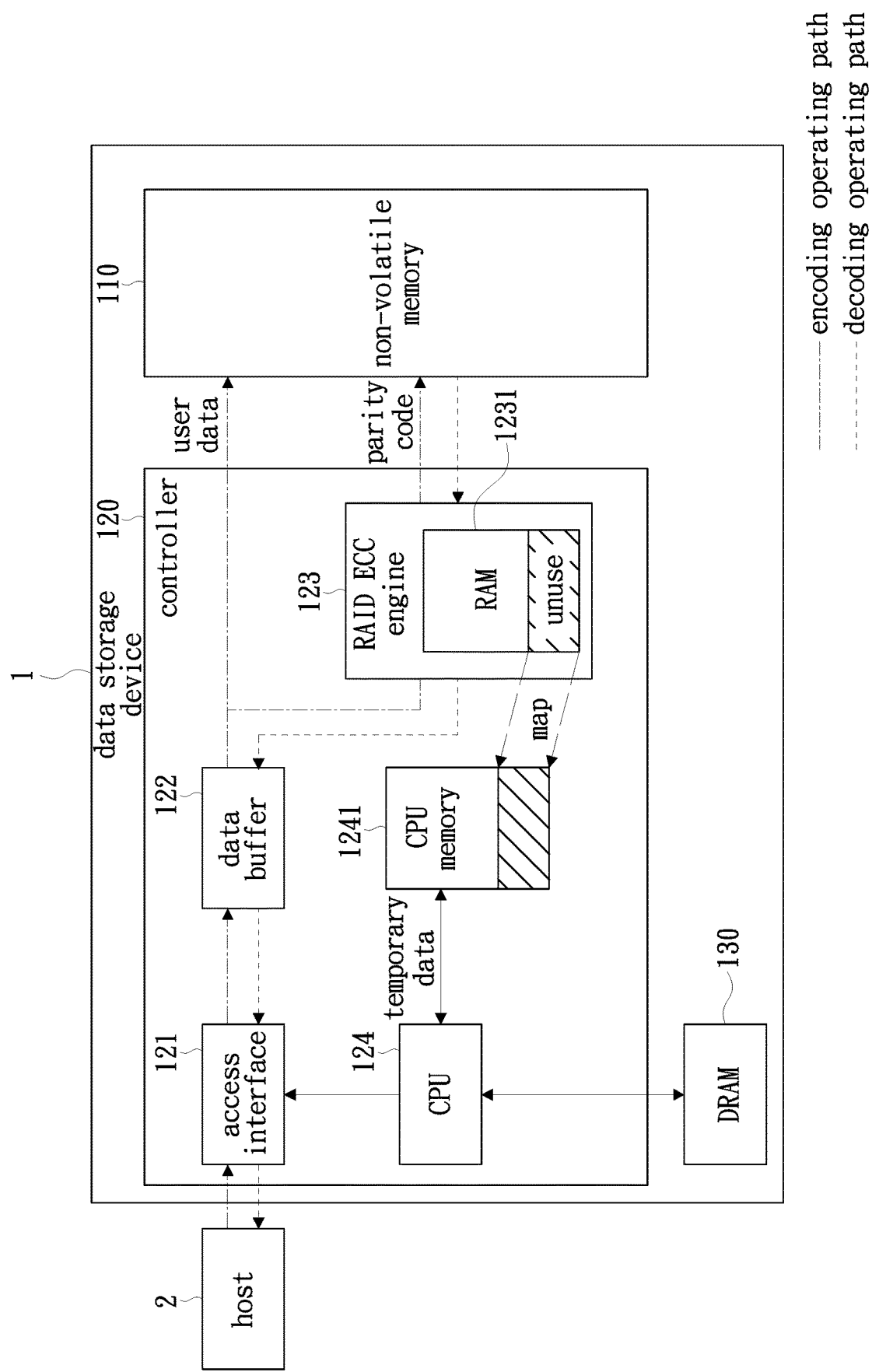
FIG. 1 is a schematic functional block diagram of a data storage device according to an embodiment of the present invention.

In the following, the present invention will be described in detail by various embodiments with the accompanying figures. However, the concepts of the present invention may be embodied in many different forms and should not be construed as being limited to the illustrative embodiments set forth herein. In addition, the same reference numerals in the drawings may be used to represent similar elements.

Firstly, please refer to FIG. 1, which is a schematic functional block diagram of a data storage device according to an embodiment of the present invention. The data storage device 1 includes a non-volatile memory 110 and a controller 120. In the embodiment, the non-volatile memory 110 includes a plurality of blocks (not shown), each block further includes a plurality of pages, and the page is the minimum unit for programming. That is, the page is the minimum unit for writing or reading data. One word line can control more than one page. In addition, the block is the minimum unit for data erasing. Blocks can be divided into spare blocks, active blocks and data blocks according to their function. The spare block is a block that can be selected and written into data. The active block is a block that has been selected and is being written into data. The data block is a block that has been written into data and data cannot be written therein any longer. It should be noted that the present invention does not limit the implementation of the blocks and the pages, and those skilled in the art should be able to make related designs according to actual needs or applications. In addition, in the embodiment, the non-volatile memory 110 is preferably implemented by flash memory, but the present invention is not limited thereto.

The controller 120 is electrically coupled to the non-volatile memory 110 and is used to control the data access in the non-volatile memory 110. It should be understood that the data storage device 1 is usually used with a host 2, and is used to write the user data to the non-volatile memory 110 or read the user data from the non-volatile memory 110 according to the write/read command issued by the host 2. Therefore, the controller 120 in the embodiment preferably is a flash memory controller, and mainly includes a central processing unit (CPU) 124, an access interface 121 and a RAID ECC engine 123. As mentioned above, the CPU 124 preferably has its own memory, such as the CPU memory 1241 for storing data or programs. In the embodiment, the data or the program stored in the CPU memory 1241 is simply referred to as temporary data. For the convenience of the following illustrations, in the embodiment, the CPU 124 and the CPU memory 1241 are depicted separately, but those skills in the art should understand that the CPU memory 1241 is actually included in the CPU 124.

The access interface 121 is coupled to the host 2 and the non-volatile memory 110. The CPU 124 is used to interpret the write/read commands issued by the host 2 to generate an operation command, and control the access interface 121 to access the non-volatile memory 110 for the user data according to the operation command. Moreover, the controller 120 in the embodiment may further include a data buffer 122. The data buffer 122 is coupled to the access interface 121, the RAID ECC engine 123 and the non-volatile memory 110, and is used to temporarily store the user data from the host 2 or the non-volatile memory 110. However, in addition to the user data, the data buffer 122 is preferably also used to temporarily store the in-system programming (ISP) or the logical-to-physical address mapping table required for the operation of the CPU 124, but the present invention is not limited thereto. In addition, the data buffer 122 in the embodiment can be, for example, a static random access memory (SRAM) or a fast access RAM.

The RAID ECC engine 123 is coupled to the CPU 124, the data buffer 122 and the non-volatile memory 110, and is mainly used to perform an error correction procedure on the user data. In the embodiment, the error correction procedure performed by the RAID ECC engine 123 is referred to as an exclusive OR (XOR) logical operation, and can be divided into an encoding operation and a decoding operation according to the function. Therefore, in FIG. 1, different operation paths will be represented by different chain-dotted lines. Further, it should be understood that the decoding operation provides functions such as the error detection and correction or data recovery. Moreover, the data storage device 1 in the embodiment may further include a dynamic random access memory (DRAM) 130, which is disposed outside the controller 120 and is also used to store the temporary data for the CPU 124. However, in addition to the DRAM 130, the CPU 124 can also utilize the DRAM (not shown) in the host 2 through the host memory buffer (HMB) to store the data or programs required for the operation of the data storage device 1. In summary, since the reason the CPU storing the temporary data to the external DRAM has been described above, no redundant detail is to be given herein.

In the embodiment, the RAID ECC engine 123 preferably also has its own memory, such as the RAM 1231. When the host 2 writes user data to the non-volatile memory 110, the controller 120 simultaneously transmits the user data to the RAID ECC engine 123 for the encoding operation. The RAID ECC engine 123 generates a parity code corresponding to the user data of page 0 to page N−1 until the transmission of the user data of a page group (e.g., the user data of the page 0 to the page N−1) is completed, and then writes the parity code to the non-volatile memory 110; wherein the parity code can be used as the data of the page N, and N is any positive integer greater than one. Moreover, if the management unit of the user data is a sector instead of a page, for example, a page can include a plurality of sectors, the controller 120 sequentially writes user data of a sector group (e.g., the user data of the sector 0 to the sector S−1) and the parity code corresponding to the user data of the sector 0 to the sector S−1 generated by the RAID ECC engine 123 to the sector 0 to the sector S of the page 0 to the page N, wherein S is any positive integer greater than one. However, since the data management of the sector and the page is similar, only the example of the page will be described below, but the present invention is not limited thereto.

In contrast, when reading the user data from the non-volatile memory 110, the controller 120 reads the user data of page according to a preset reading parameter and uses other ECCs, such as low density parity check (LDPC) code, to perform the error correction operation on the read user data of page. When the controller 120 reads the user data of a specific page (e.g., user data of page 1) in the page group and the LDPC code cannot correct the error, the controller 120 can read the user data of pages 0 and 2-N−1 in the page group and the parity code of page N from the non-volatile memory 110 and transmit them to the RAID ECC engine 123 for the decoding operation; wherein the obtained data after the decoding operation is referred to as the corrected user data of page 1. The operation principle of the RAID ECC engine 123 will be described in the following embodiments, no redundant detail is to be given herein.

In summary, the internal RAM 1231 is used for temporary store of the operation value when the RAID ECC engine 123 performs the encoding operation or the decoding operation; wherein the size of the internal RAM 1231 is, for example, 64 KB. However, according to the actual needs, such as the size of page, the size of parity code or the number of used path, the RAID ECC engine 123 may need only 16 KB or 32 KB of memory space while operates. As such, the unused memory space is a waste for the system resource when the memory space of the RAM 1231 is not fully used. Therefore, as shown by the inclined-line block in FIG. 1, the embodiment maps the unused memory space in the RAM 1231 to the CPU memory 1241, that is, shares the unused memory space, and maps the address of the unused memory space to the address of the memory space of the CPU memory 1241, so that the unused memory space in the RAM 1231 is virtualized as part of CPU memory 1241, that is, the memory space of the CPU memory 1241 is equivalently extended. In this way, the CPU 124 can utilize the unused memory space of the RAM 1231 to store the temporary data. In other words, the internal memory space available to the CPU 124 is extended, and the temporary data can be stored in the RAM 1231 of the RAID ECC engine 123 in addition to the CPU memory 1241, without being stored in the DRAM 130 outside the controller 120. In this way, the frequency of the CPU 124 accessing the DRAM 130 is reduced, and therefore the performance of the overall system is improved.

Then, the implementation of the RAID ECC engine 123 in the embodiment will be further described. Please refer to FIG. 2, which is a schematic functional block diagram of the RAID ECC engine shown in the data storage device of FIG. 1. The components in FIG. 2 and the same components as those in FIG. 1 are labeled with the same drawing numbers, and no redundant detail is to be given herein. In the embodiment, the RAID ECC engine 123 mainly includes a state machine 220, a selector 230, a control register 240 and M+1 operation circuits 210_0-210_M, wherein M is any positive integer greater than one. Each of the operation circuits 210_0 to 210_M includes an XOR arithmetic logic unit (ALU), a page buffer and a first selector. For example, the operation circuit 210_0 includes an XOR ALU 211_0, a page buffer 212_0 and a first selector 213_0, and so on. The operation circuit 210_M includes an XOR ALU 211_M, a page buffer 212_M and a first selector 213_M. It should be understood that the state machine 220, the selector 230, the control register 240, the XOR ALUs 211_0-211_M, and the first selectors 213_0-213_M mentioned above can be implemented by a pure hardware circuit, or can be implemented by a hardware circuit with firmware or software, but the present invention is not limited thereto.

Figure 2:
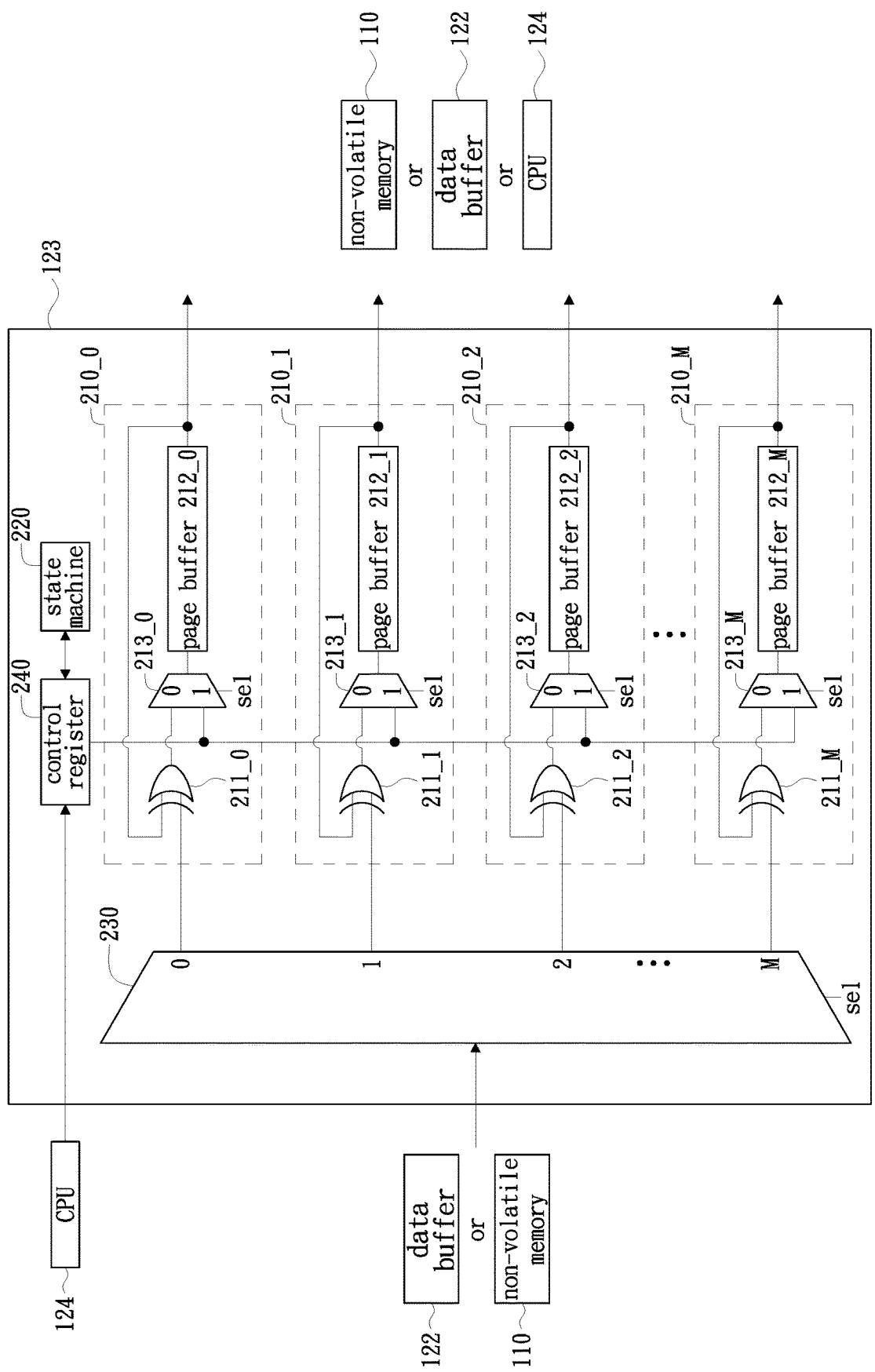
FIG. 2 is a schematic functional block diagram of a RAID ECC engine in the data storage device shown in FIG. 1.

In the embodiment, the control register 240 is coupled to the CPU 124 and is used to receive at least one control signal from the CPU 124 and the temporary data. Moreover, for the convenience of the following illustrations, the present embodiment will be described first with only one of the operation circuits, for example, the operation circuit 210_0. However, those skills in the art should be able to understand the operating principle of the other operation circuits 210_1 to 210_M. As shown in FIG. 2, the first selector 213_0 has two input terminals 0, 1 and one output terminal. The input terminals 0 and 1 of the first selector 213_0 are respectively coupled to the output terminal of the XOR ALU 211_0 and the control register 240, and the output terminal of the first selector 213_0 is coupled to the page buffer 212_0. In the embodiment, the CPU 124 can control (set), through the control register 240, the select terminal sel of the first selector 213_0 to select the input terminal 0 as the input source of the page buffer 212_0 for inputting data. As such, the input data at this time is the operation result of the XOR ALU 211_0, and the operation result can be stored in the page buffer 212_0. In contrast, the CPU 124 can also control (set), through the control register 240, the select terminal sel of the first selector 213_0 to select the input terminal 1 as the input source of the page buffer 212_0 for inputting data. As such, the input data at this time is the temporary data from the CPU 124 provided by the control register 240, and the temporary data can also be stored in the page buffer 212_0. That is, the RAM 1231 in FIG. 1 can be composed, for example, by the page buffers 212_0-212_M in FIG. 2. When the operation circuit 210_0 does not perform the encoding operation or the decoding operation (i.e., the page buffer 212_0 of the operation circuit 210_0 is not used), the CPU 124 can control the first selector 213_0 so that the input terminal 1 of the first selector 213_0 is as the input source of the page buffer 212_0. In this way, the unused page buffer 212_0 can be used to store the temporary data from the CPU 124, thereby achieving the purpose of the present invention.

In details, the state machine 220 is coupled to the control register 240 and is used to control the RAID ECC engine 123 to perform either an encoding operation or a decoding operation, or to enable the RAID ECC engine 123 either in an idle state or in a done state. In addition, the state machine 220 can further assist the control register 240 to control (set) the select terminal sel of the first selectors 213_0 to 213_M to determine the input source of the page buffers 212_0 to 212_M, and assist the control register 240 to control the select terminal sel of the selector 230 to determine the output terminal. In the embodiment, the selector 230 has M+1 output terminals and an input terminal, wherein the M+1 output terminals of the selector 230 are respectively coupled to the input terminals of the operation circuits 210_0 to 210_M, and the input terminal of the selector 230 is coupled to the data buffer 122 or the non-volatile memory 110. Therefore, in the embodiment, the CPU 124 can also control (set) the select terminal sel of the selector 230 through the control register 240, so that the user data received by the input terminal of the selector 230 is outputted to the designated operation circuit 210_0 to 210_M to perform the subsequent encoding operation or the decoding operation. In summary, the control register 240 is not only used to control (set) the select terminal sel of the first selector 213_0 to 213_M but also used to control (set) the select terminal sel of the selector 230, and further used to control the operation of the state machine 220. In practice, the first selectors 213_0 to 213_M of the operation circuits 210_0 to 210_M preferably are respectively implemented by a multiplexer (MUX), and the selector 230 preferably is implemented by a demultiplexer (DeMUX), but the present invention is not limited thereto.

Figure 3A:
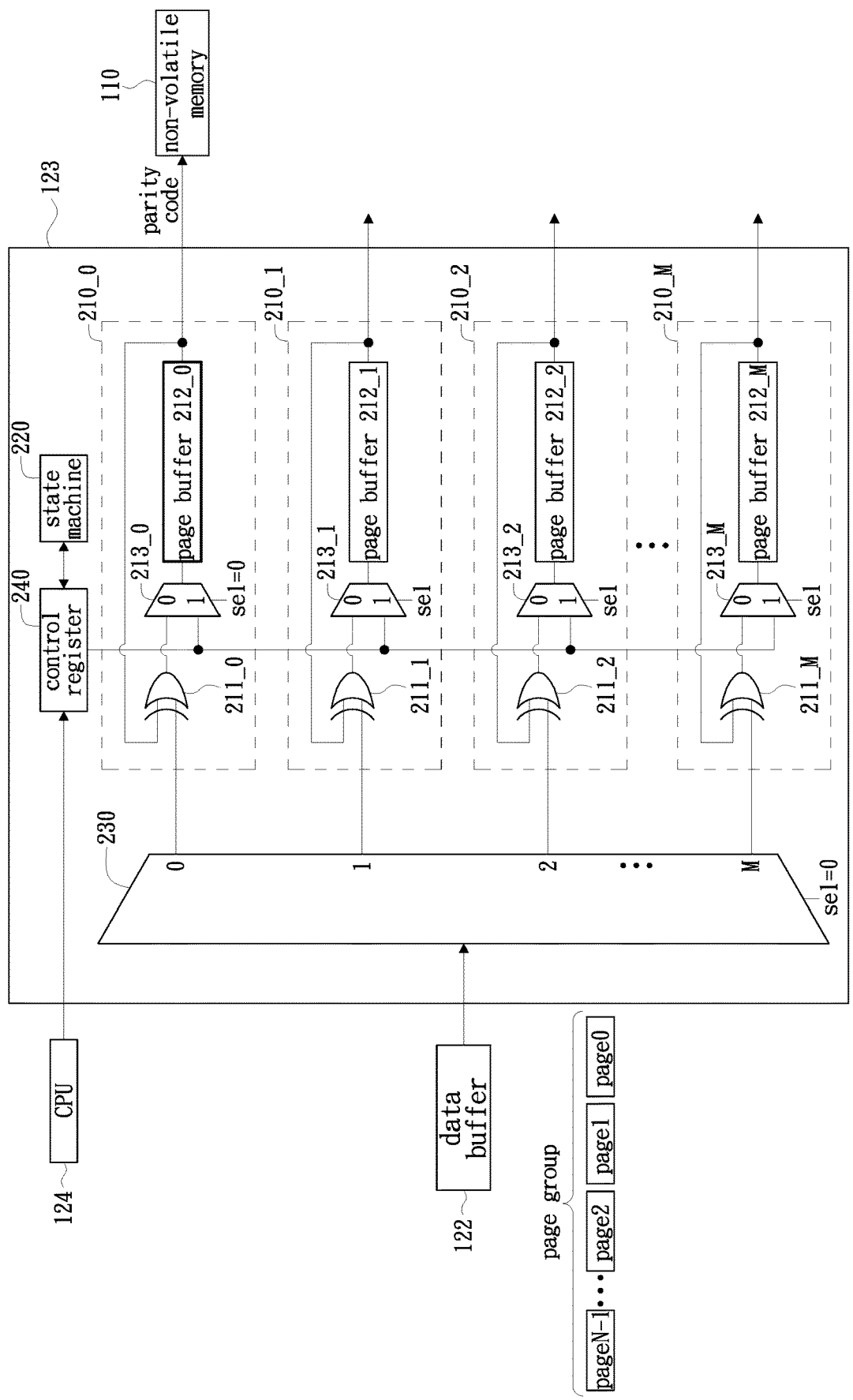
FIG. 3A is a schematic diagram of a RAID ECC engine shown in FIG. 2 performing an encoding operation.
Figure 3B:
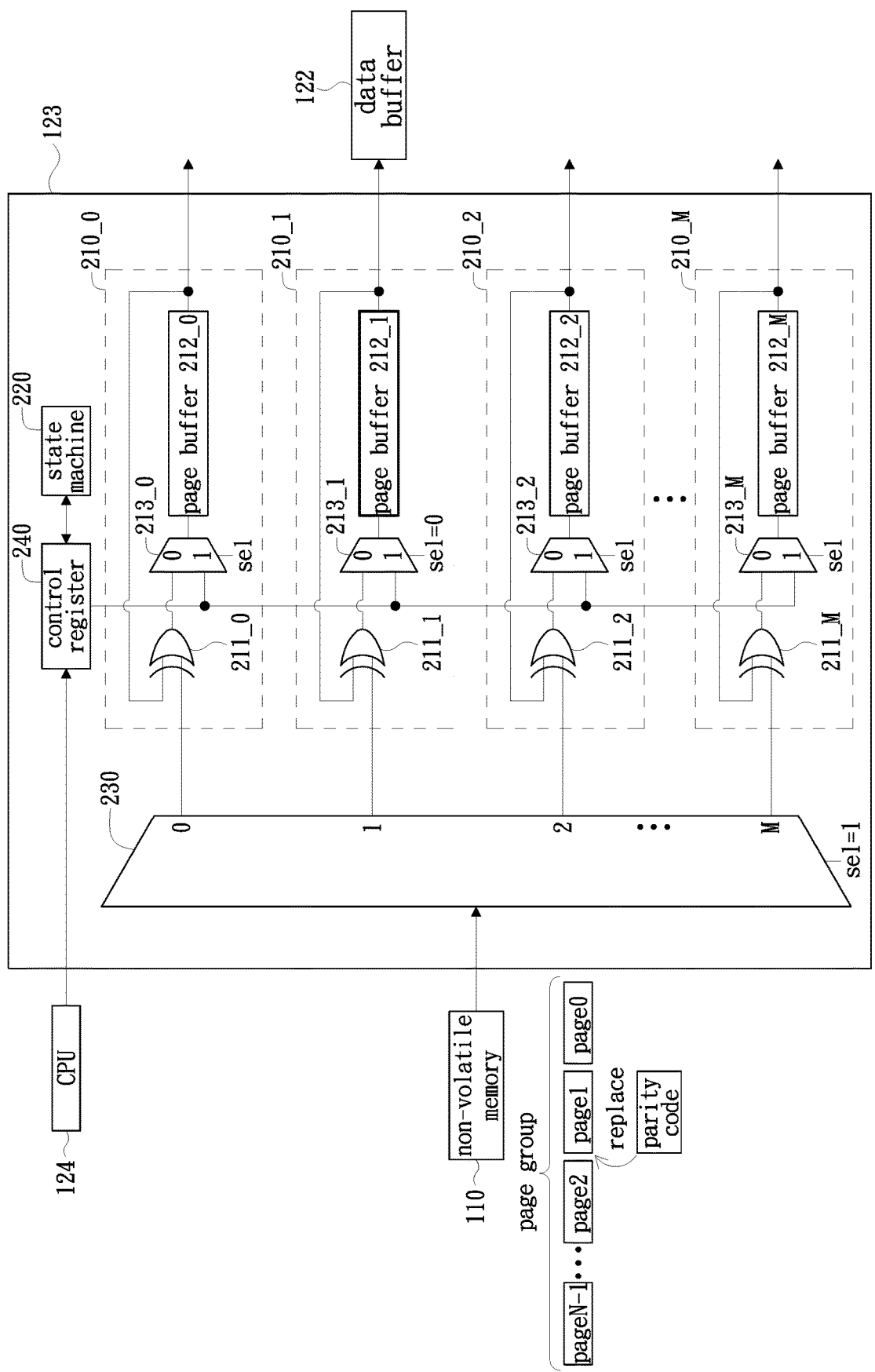
FIG. 3B is a schematic diagram of a RAID ECC engine shown in FIG. 2 performing a decoding operation.
Figure 3C:
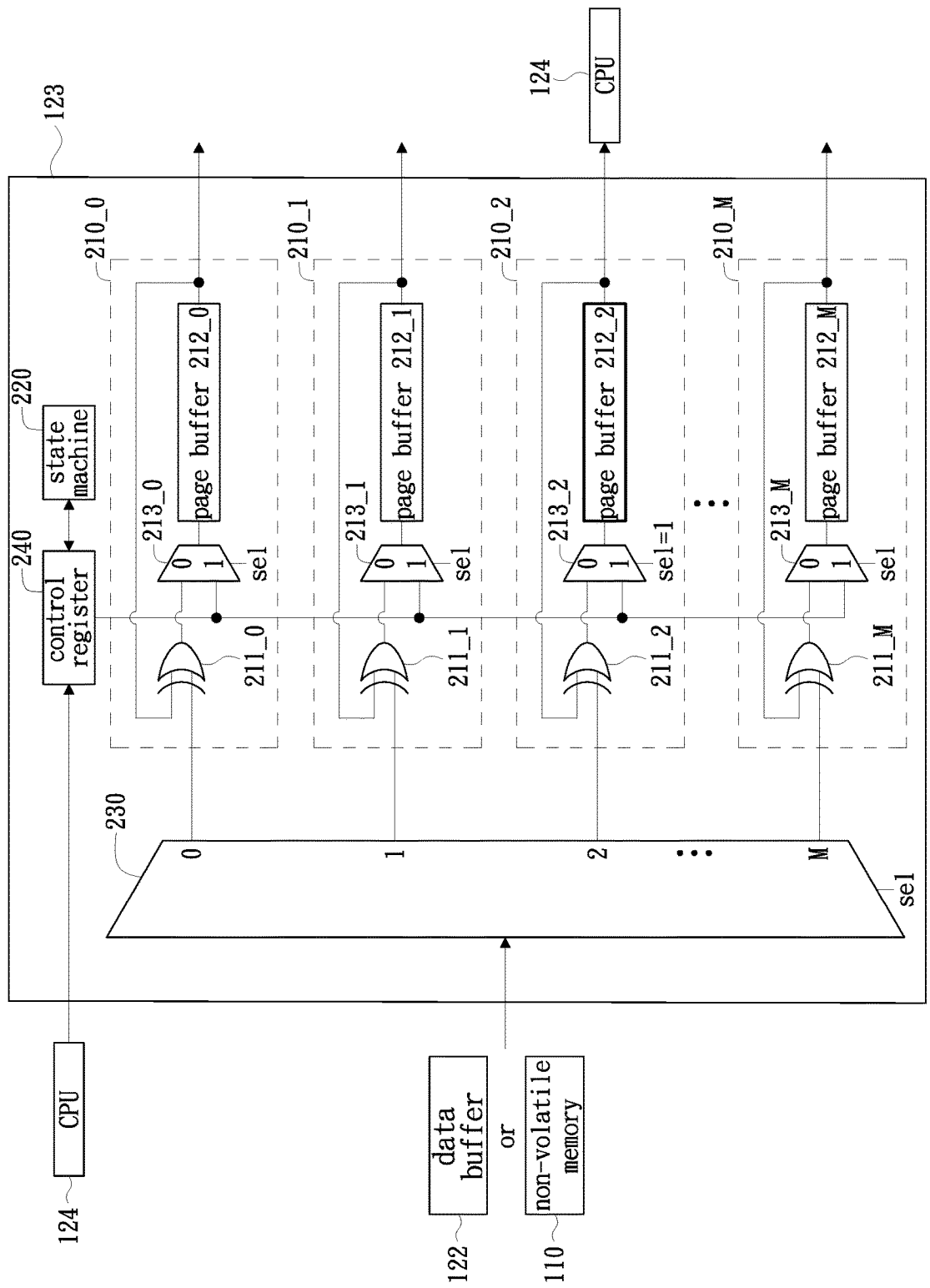
FIG. 3C is a schematic diagram of a RAID ECC engine shown in FIG. 2 performing a memory sharing.

Then, please also refer to FIG. 3A to FIG. 3C. FIG. 3A to FIG. 3C are used to illustrate the operating principle of the RAID ECC engine 123 in the embodiment in detail, wherein FIG. 3A and FIG. 3B are respectively the schematic diagrams of the RAID ECC engine 123 shown in FIG. 2 performing the encoding operation and the decoding operation, and FIG. 3C is a schematic diagram of the RAID ECC engine 123 shown in FIG. 2 performing a memory sharing. As shown in FIG. 3A, when the host 2 writes the user data to the non-volatile memory 110, the CPU 124 first temporarily stores the user data in the data buffer 122 and then outputs the user data to the RAID ECC engine 123. Then, the CPU 124 triggers the state machine 220 by setting the control register 240 to configure the RAID ECC engine 123 to perform the encoding operation on the user data. Then, the control register 240 controls the selector 230 so that the user data (e.g., the user data of pages 0 to N−1) received by the input terminal of the selector 230 from the data buffer 122 is outputted to the operation circuit 210_0 through the output terminal 0 of the selector 230. Meanwhile, the control register 240 sets the select terminal sel of the first selector 213_0 of the operation circuit 210_0 as "0", so that the XOR ALU 211_0 of the operation circuit 210_0 can perform the encoding operation (XOR logical operation) on the user data outputted from the selector 230 and the encoding data temporarily stored in the page buffer 212_0 and then output the operation result (new encoding data) to the page buffer 212_0 to replace the original temporarily stored encoding data (old encoding data). According to the above procedure, the operation circuit 210_0 can sequentially receive the user data of pages 0 to N−1 transmitted by the data buffer 122, perform the encoding operation on the user data of pages 0 to N−1 by the XOR ALU 211_0, and then obtain the parity code having a size of one page, thereby completing the entire encoding operation. Finally, the RAID ECC engine 123 writes the parity code into the page N of the non-volatile memory 110 through the page buffer 212_0 again, or the RAID ECC engine 123 outputs the parity code to the data buffer 122, and then the data buffer 122 sequentially writes the user data of pages 0 to N−1 and the parity code to the pages 0-N of the non-volatile memory 110. In summary, the present invention does not limit the specific implementation of writing the user data and the parity code into the non-volatile memory 110. The above encoding operation performed by the operation circuit 210_0 is merely an example, and the present invention is not limited thereto. The CPU 124 can determine which operation circuits are to be used to perform the encoding operation according to the actual needs or applications.

In contrast, as shown in FIG. 3B, when the controller 120 reads the user data of the page 1 and then the error which cannot be corrected occurs, the CPU 124 triggers the state machine 220 by setting the control register 240 to configure the RAID ECC engine 123 to perform the decoding operation. Then, the control register 240 controls the selector 230 so that the user data (e.g., the user data of the pages 0, 2 to N) received by the input terminal of the selector 230 from the non-volatile memory 110 and the parity code of the page N is outputted to the operation circuit 210_1 through the output terminal 1 of the selector 230. Meanwhile, the control register 240 sets the select terminal sel of the first selector 213_1 of the operation circuit 210_1 as "0", so that the XOR ALU 211_1 of the operation circuit 210_1 can perform the decoding operation (XOR logical operation) on the data outputted from the selector 230 and the decoding data temporarily stored by the page buffer 212_1 and then outputs the operation result (new decoding data) to the page buffer 212_1 to replace the original temporary decoding data (old decoding data). According to the above procedure, the operation circuit 210_1 can sequentially receive the user data of the pages 0, 2 to N−1 and the parity code of the page N, transmitted from the non-volatile memory 110 and perform the encoding operation on the user data of the pages 0, 2 to N−1 by the XOR ALU 211_0 and then finally obtain the decoding data having a size of one page, which is the user data of the page 1 after correcting the error, thereby completing the entire decoding operation. Finally, the RAID ECC engine 123 outputs the user data of the page 1 after correcting the error to the data buffer 122 again and replaces the user data of the page 1 with the data buffer 122 temporarily stores (incorrect). Moreover, in other embodiment, the user data of the pages 0, 2 to N−1 and the parity code of the page N can be first transmitted to the data buffer 122, and transmitted to the RAID ECC engine 123 by the data buffer 122 for the decoding operation, but the present invention is not limited thereto. In summary, since the operation principle of the encoding or the decoding performed by the RAID ECC engine 123 has known by those skills in the art, the details mentioned above are not repeated again. Of course, when the controller 120 reads the user data of the page 1 and does not occur the error which cannot be corrected, the CPU 124 need not set the control register 240, or can set the control register 240 so that the RAID ECC engine 123 is enabled in the power saving mode.

Furthermore, as shown in FIG. 3C, when the operation circuit 210_2 is not used, the CPU 124 controls the first selector 213_2 by setting the control register 240, so that the input terminal 1 of the first selector 213_2 is as the input source of the page buffer 212_2. That is, the select terminal sel of the first selector 213_2 in FIG. 3C is set to "1"; in this way, the temporary data to be stored by the CPU 124 can be transmitted to the input terminal 1 of the first selector 213_2 via the control register 240 and thereby being written into the page buffer 212_2. Similarly, the CPU 124 can read the temporary data in the page buffer 212_2 through the control register 240. That is, in the embodiment, all the page buffers that are not used can be converted into the paths accessed by the CPU 124 by setting the control register 240, that is, the page buffers that are not used are shared and mapped to the CPU memory 1241 of the CPU 124, thereby expanding the CPU memory 1241 and improving the performance of the overall system. Of course, if the RAID ECC engine 123 does not need to perform the encoding operation or the decoding operation, the embodiment does not need to control (set) the selector 230. Moreover, all paths in the embodiment, such as the path of the encoding operation, the path of the decoding operation, and the path that the CPU 124 can access the temporary data, can be set by the control register 240, and therefore, all paths can operate at the same time as long as these paths are not selected to the same page buffer.

Figure 4:
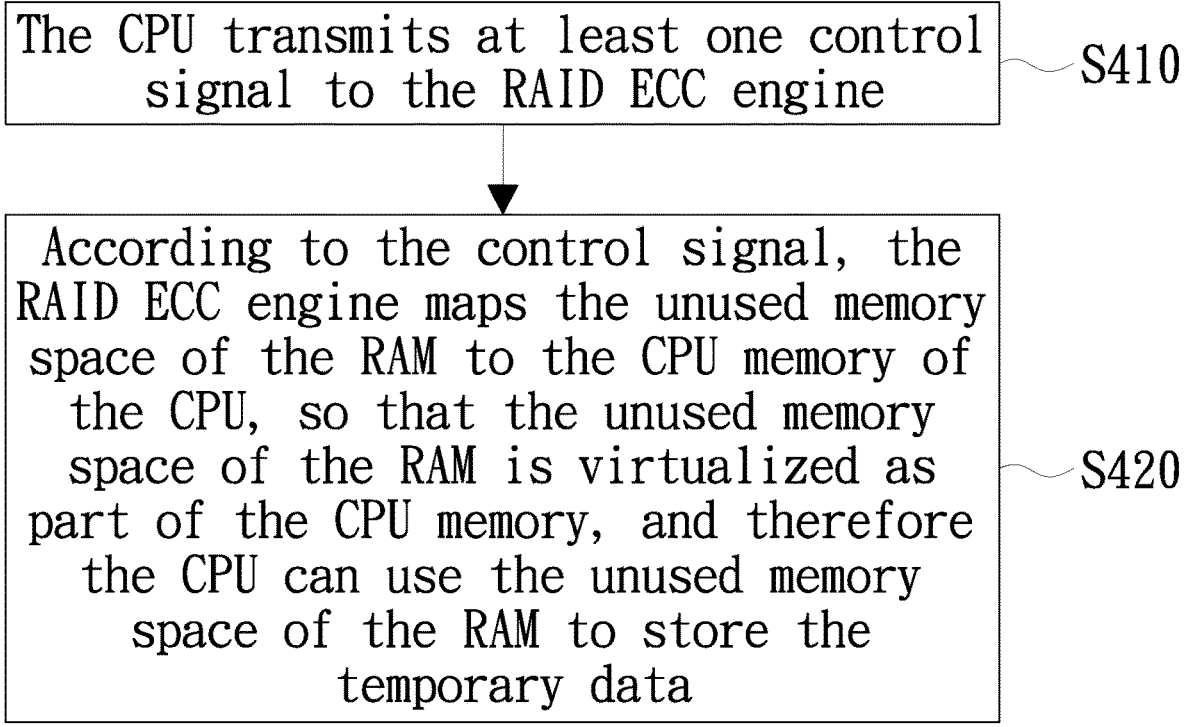
FIG. 4 is a schematic flow chart of a method for sharing memory of a controller according to an embodiment of the present invention.

Finally, in order to further illustrate the operation procedure in which the data storage device 1 shares the memory in the RAID ECC engine 123, the present invention further provides an implementation of a method thereof. Please also refer to FIG. 4, which is a schematic flowchart of a method for sharing memory in a controller according to an embodiment of the present invention. It should be noted that the method in FIG. 4 can be applied to the data storage device 1 in FIG. 1, but the present invention does not limit that the method in FIG. 4 is only applied to the data storage device 1 in FIG. 1. As shown in FIG. 4, in step S410, the CPU 124 transmits at least one control signal to the RAID ECC engine 123. Thereafter, in step S420, according to the control signal, the RAID ECC engine 123 maps the unused memory space of the RAM 1231 to the CPU memory 1241 of the CPU 124, so that the unused memory space of the RAM 1231 is virtualized as part of the CPU memory 1241, and therefore the CPU 124 can use the unused memory space of the RAM 1231 to store the temporary data. Since the details are also the same as described above, no redundant detail is to be given herein.

In summary, the data storage device and the method for sharing memory in the controller thereof provided by the embodiment of the present invention can share the memory of the RAID ECC engine and map it to the memory of the CPU, thereby expanding the memory of the CPU. As such, the temporary data to be stored by the CPU does not need to be stored in the DRAM outside the controller, so that the frequency of the CPU 124 accessing the external DRAM can be reduced and the performance of the overall system can be improved.

The contents mentioned above are only for the embodiments of the present invention but not to limit the claim of the present invention.

What is claimed is:

1. A data storage device, comprising:
    a non-volatile memory; and
    a controller, electrically coupled to the non-volatile memory, comprising:
        an access interface, coupled to a host and the non-volatile memory;
        a redundant array of independent disks (RAID) error correcting code (ECC) engine, for performing an error correction procedure; and
        a central processing unit (CPU), for interpreting write/read commands issued by the host and controlling the access interface to access the non-volatile memory for user data, wherein there are a first memory in the CPU for storing temporary data and a second memory in the RAID ECC engine, and the controller maps an unused memory space of the second memory in the RAID ECC engine to the first memory, which is virtualized as part of the first memory when the second memory in the RAID ECC engine is not fully used, so that the CPU uses the unused memory space of the second memory in the RAID ECC engine to store the temporary data.

2. The data storage device according to claim 1, wherein the controller further comprises a data buffer, coupled to the access interface, the RAID ECC engine and the non-volatile memory, for temporarily storing the user data from the host or the non-volatile memory.

3. The data storage device according to claim 2, wherein the RAID ECC engine comprises:
    a control register, coupled to the CPU and for receiving at least one control signal from the CPU and the temporary data; and
    a plurality of operation circuits, and each of the plurality of operation circuits comprising:
        an exclusive OR (XOR) arithmetic logic unit (ALU);
        a page buffer; and
        a first selector, having two input terminals and an output terminal, wherein the two input terminals of the first selector are respectively coupled to an output terminal of the XOR ALU and the control register, the output terminal of the first selector is coupled to the page buffer, the CPU controls the first selector by the control register to determine an input source of the page buffer, so that the page buffer stores an operation result from the XOR ALU or stores the temporary data from the CPU.

4. The data storage device according to claim 3, wherein the error correction procedure is divided into to an encoding operation or a decoding operation, and the RAID ECC engine further comprises:
    a state machine, coupled to the control register and for controlling the RAID ECC engine to perform the encoding operation or the decoding operation; and
    a second selector, having a plurality of output terminals and an input terminal, wherein the plurality of output terminals of the second selector is respectively coupled to input terminals of the plurality of operation circuits, the input terminal of the second selector is coupled to the data buffer or the non-volatile memory, and the CPU controls the second selector by the control register, so that the user data received by the input terminal of the second selector from the data buffer or the non-volatile memory is outputted to at least one of specific operation circuits.

5. A method for sharing memory of a controller adapted to be used in a data storage device, the data storage device comprising a non-volatile memory and the controller electrically coupled to the non-volatile memory, the controller comprising an access interface, a RAID ECC engine and a CPU, the access interface being electrically coupled to a host and the non-volatile memory, the RAID ECC engine performing an error correction procedure, the CPU interpreting write/read commands issued by the host and controlling the access interface to access the non-volatile memory for user data, wherein there are a first memory in the CPU for storing temporary data and a second memory in the RAID ECC engine, and the method comprising steps of:
    configuring the CPU to issue at least one control signal to the RAID ECC engine; and
    according to the control signal, configuring the RAID ECC engine to map an unused memory space of the second memory in the RAID ECC engine to the first memory, which is virtualized as part of the first memory, so that the CPU uses the unused memory space of the second memory in the RAID ECC engine to store the temporary data.

6. The method according to claim 5, wherein the controller further comprises:
    a data buffer, coupled to the access interface, the RAID ECC engine and the non-volatile memory, for temporarily storing the user data from the host or the non-volatile memory.

7. The method according to claim 6, wherein the RAID ECC engine comprises:
    a control register, coupled to the CPU and for receiving at least one control signal from the CPU and the temporary data; and
    a plurality of operation circuits, and each of the plurality of operation circuits comprising:
        an exclusive OR (XOR) arithmetic logic unit (ALU);
        a page buffer; and
        a first selector, having two input terminals respectively coupled to an output terminal of the XOR ALU and the control register and an output terminal coupled to the page buffer, wherein the CPU controls the first selector by the control register to determine an input source of the page buffer, so that the page buffer stores an operation result from the XOR ALU or stores the temporary data from the CPU.

8. The method according to claim 7, wherein the error correction procedure is divided into an encoding operation or a decoding operation, and the RAID ECC engine further comprises:
    a state machine, coupled to the control register and controlling the RAID ECC engine for performing the encoding operation or the decoding operation; and
    a second selector, having a plurality of output terminals and an input terminal, wherein the plurality of output terminals of the second selector is respectively coupled to input terminals of the plurality of operation circuits, the input terminal of the second selector is coupled to the data buffer or the non-volatile memory, and the CPU controls the second selector by the control register, so that the user data received by the input terminal of the second selector from the data buffer or the non-volatile memory is output to at least one of specific operation circuits.

\* \* \* \* \*